(12) United States Patent
Imre et al.

(10) Patent No.: US 7,635,138 B2
(45) Date of Patent: Dec. 22, 2009

(54) FRAME INTEGRATED REAR SUSPENSION

(75) Inventors: Christian Imre, Rochester, MI (US); James P. O'Connor, Sylvan Lake, MI (US); Gianfranco Gabbianelli, Troy, MI (US)

(73) Assignee: Magna International, Inc., Aurora, Ontario (CA)

( * ) Notice: Subject to any disclaimer, the term of this patent is extended or adjusted under 35 U.S.C. 154(b) by 411 days.

(21) Appl. No.: 10/566,117

(22) PCT Filed: Jul. 28, 2004

(86) PCT No.: PCT/US2004/025719

§ 371 (c)(1),
(2), (4) Date: Jan. 24, 2006

(87) PCT Pub. No.: WO2005/012010

PCT Pub. Date: Feb. 10, 2005

(65) Prior Publication Data

US 2006/0237938 A1 Oct. 26, 2006

(51) Int. Cl.
*B60G 9/02* (2006.01)
*B60G 3/14* (2006.01)
*B60G 21/05* (2006.01)

(52) U.S. Cl. .......................... 280/124.116; 280/124.128

(58) Field of Classification Search .......... 280/124.116, 280/124.156, 124.128, 124.109, 124.134, 280/124.145, 124.153
See application file for complete search history.

(56) References Cited

U.S. PATENT DOCUMENTS 2,989,133 A 6/1961 Hodkin
3,147,815 A * 9/1964 Arkus-Duntov et al. ..... 180/360
3,603,422 A 12/1968 Cordiano (Continued)

FOREIGN PATENT DOCUMENTS

CH 271542 6/1995

(Continued)

OTHER PUBLICATIONS

English Abstract of JP 6127231.

*Primary Examiner*—Paul N Dickson
*Assistant Examiner*—Karen Jane J Amores
(74) *Attorney, Agent, or Firm*—Harness, Dickey & Pierce, P.L.C.

(57) ABSTRACT

An integrated rear suspension assembly is fixedly secured to a transmission case, rear wheel carriers and frame rails of a motor vehicle. The integrated rear suspension assembly includes a plurality of trailing arms having first and second ends. Each of the first ends is secured to one of the frame rails and each of the second ends is secured to each of the rear wheel carriers. A plurality of control arms is pivotally secured to each of the plurality of trailing arms for controlling the plurality of trailing arms. A compound link member having opposing ends is attached to each of the plurality of trailing arms. The integrated rear suspension assembly also includes a transmission cross member that is fixedly secured to each of the frame rails. The transmission cross member includes fixtures that receive and secure the transmission case and each of the plurality of control arms thereto such that the transmission cross member facilitates the integrated rear suspension assembly and the transmission case to be assembled prior to securing said integrated suspension assembly to the frame rails.

16 Claims, 4 Drawing Sheets

U.S. PATENT DOCUMENTS

| | | |
|---|---|---|
| 4,852,904 A | 8/1989 | Yamamoto |
| 4,881,752 A * | 11/1989 | Tanaka ................ 280/124.128 |
| 5,036,943 A | 8/1991 | Kashiwagi |

FOREIGN PATENT DOCUMENTS

| | | |
|---|---|---|
| DE | 24 39 365 | 2/1976 |
| DE | 31 36 125 | 4/1983 |
| EP | 0 193 090 A2 | 9/1986 |
| EP | 1 245 477 A2 | 10/2002 |
| GB | 1131479 | 10/1967 |
| JP | 06127231 | 10/1992 |
| JP | 6127231 | 5/1994 |
| WO | 95/00789 | 6/1995 |
| WO | WO 96/00661 | 1/1996 |
| WO | WO 98/38055 | 9/1998 |

* cited by examiner

FRAME INTEGRATED REAR SUSPENSION

BACKGROUND ART

1. Field of the Invention

The invention relates generally to wheel suspension systems for motor vehicles. More particularly, the invention relates to a rear wheel independent suspension system.

2. Description of Related Art

Suspension systems of a vehicle connect the axle shafts with the vehicle body. The suspension system controls a position of a tire with respect to the vehicle body. In addition, the suspension system prevents the axle shaft from directly transmitting vibrations or impacts from a road surface to the vehicle body; thereby, providing a smoother ride. Typically, suspension systems are made to be flexible to absorb the impact from a driving surface and limit the forces transmitted from the tires to the vehicle body.

Suspension systems are generally classified according to their performance characteristics and structures. For example, many vehicles are manufactured with independent rear suspensions wherein each rear wheel is able to react to the conditions of driving without transmitting its motion and forces to the vehicle body or other rear wheel. This independent suspension improves the handling and driving characteristics of the vehicle.

Typically, independent suspensions are designed such that they exhibit dynamic handling responses during understeering conditions. A preferred suspension design would exhibit minor changes of wheel position when driven in a straight line, as well as exhibit a high transverse reaction force during cornering. Such suspension characteristics are typically achieved by a suspension having a high roll center, as well as the ability to provide for changes in camber angle to compensate for body roll during a cornering maneuver. Further, lateral forces produced during a cornering maneuver should typically generate a toe-in behavior equaling the body roll understeering during the cornering maneuver.

As well as the performance characteristics outlined above, it is desirable to have a suspension system having a reduced number of parts thereby lowering the overall cost of a suspension system for a motor vehicle. There is, therefore, a need in the art for a suspension system providing a significant toe-in through lateral forces, as well as a high roll center and a reduced number of parts compared to typical suspension systems; thereby, lowering the overall cost of a suspension system.

SUMMARY OF THE INVENTION

An integrated rear suspension assembly is fixedly secured to a transmission case, rear wheel carriers, and frame rails of a motor vehicle. The integrated rear suspension assembly includes a plurality of trailing arms having first and second ends. Each of the first ends is secured to one of the frame rails and each of the second ends is secured to each of the rear wheel carriers. A plurality of control arms is pivotally secured to each of the plurality of trailing arms for controlling the plurality of trailing arms. A compound link member having opposing ends is attached to each of the plurality of trailing arms. The integrated rear suspension assembly also includes a transmission cross member that is fixedly secured to each of the frame rails. The transmission cross member includes fixtures that receive and secure the transmission case and each of the plurality of control arms thereto such that the transmission cross member facilitates the integrated rear suspension assembly and the transmission case to be assembled prior to securing said integrated suspension assembly to the frame rails.

BRIEF DESCRIPTION OF THE DRAWINGS

Additional features and advantages of the invention will become apparent from the following detailed description taken in conjunction with the accompanying drawings in which.

DETAILED DESCRIPTION OF THE PREFERRED EMBODIMENTS

Figure 1:
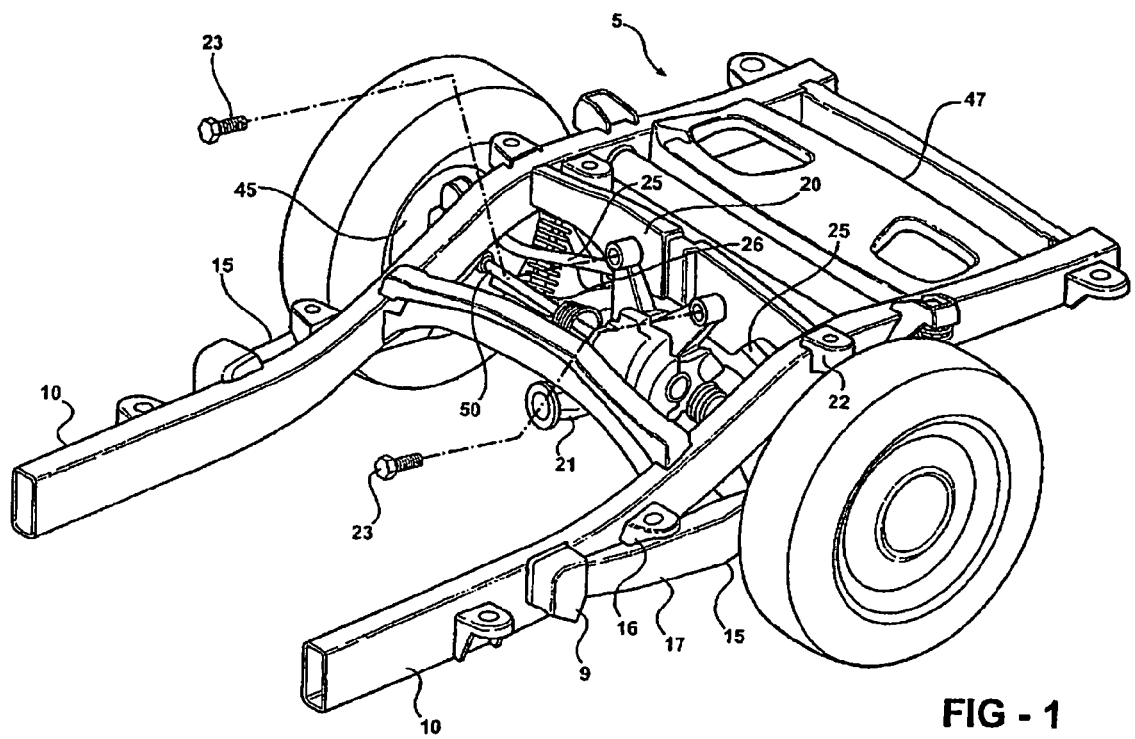
FIG. 1 is a top, front perspective view of the suspension system of the invention.

Referring to FIG. 1, a rear wheel suspension system, generally indicated at 5, including a pair of spaced frame rails 10, a pair of trailing arms 15, and a transmission cross member 20 is shown. A pair of upper control arms 25 are connected at one end 26 to the transmission cross member 20 and at a second end 27 to the trailing arms 15. A compound link member 30 is attached to the pair of trailing arms 15 at opposing ends 31, 32 of the compound link member 30. The compound link member 30 includes a bell crank 35 associated therewith. A watts linkage 40 including opposing connecting rods 41, 42 attached at one end 43 to the frame rail 10 and at the other ends 44 to the bell crank 35 is also included. A rear cross member 47 is fixedly secured to the frame rails 10. The rear cross member 47 has a low profile that results in a lowered load floor (not shown).

Figure 2:
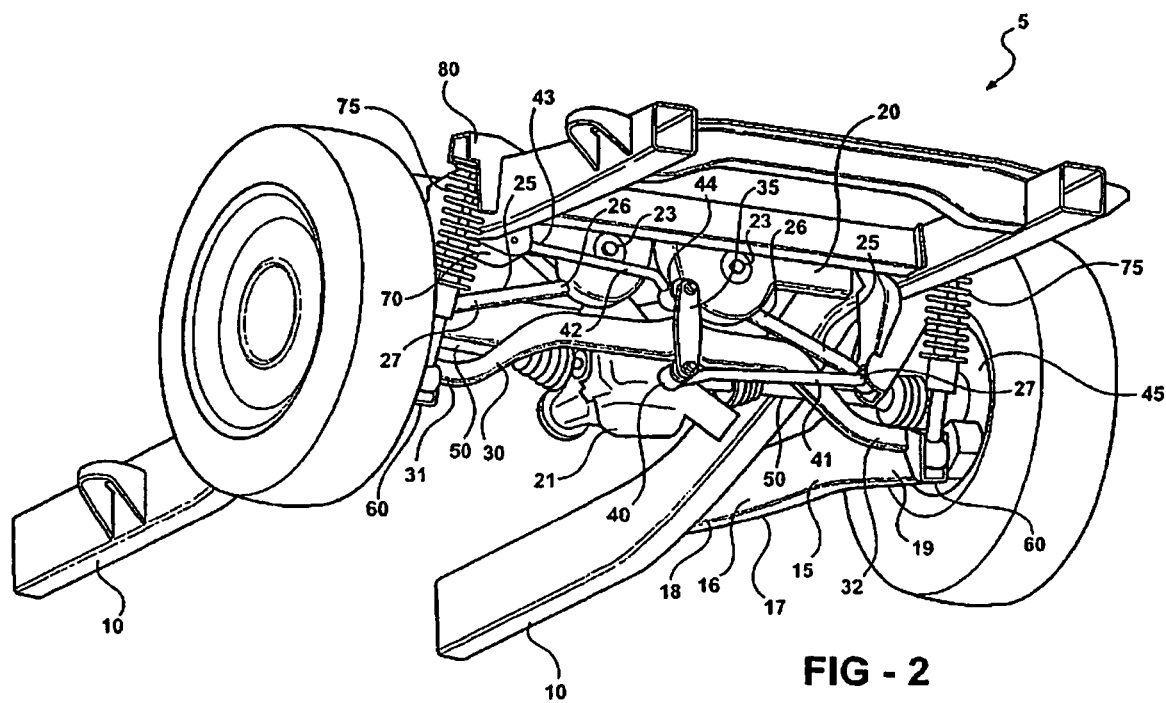
FIG. 2 is a rear, bottom perspective view of the suspension system of the invention.

As seen in FIG. 2, the pair of spaced frame rails 10 are connected to each other by various cross members distributed along a length of the frame rails 10 Specifically, the transmission cross member 20 provides support to the transmission casing 21, as well as provides structural rigidity to a chassis of a vehicle formed by the frame rails 10. The transmission cross member 20 includes fixtures, shown as bolts 23 in FIG. 1, to secure the transmission case 21 thereto. The transmission cross member 20 includes fixtures to secure the control arms 25 thereto. The transmission cross member 20 is preferably coupled to the frame rails 10 using brackets 22 attached to the frame rails 10, as best seen in FIG. 1.

The pair of trailing arms 15 includes inner 16 and outer 17 components. The inner component 16 is nested within the outer component 17. Each of the inner 16 and outer 17 components extend the length of the trailing arms 15. Each of the trailing arms 15 is attached to each of the spaced frame rails 10. A first end 18 of the trailing arm 15 is secured to the trailing arms 15 with a bracket 9. A second end is attached to a wheel carrier 45.

Figure 3:
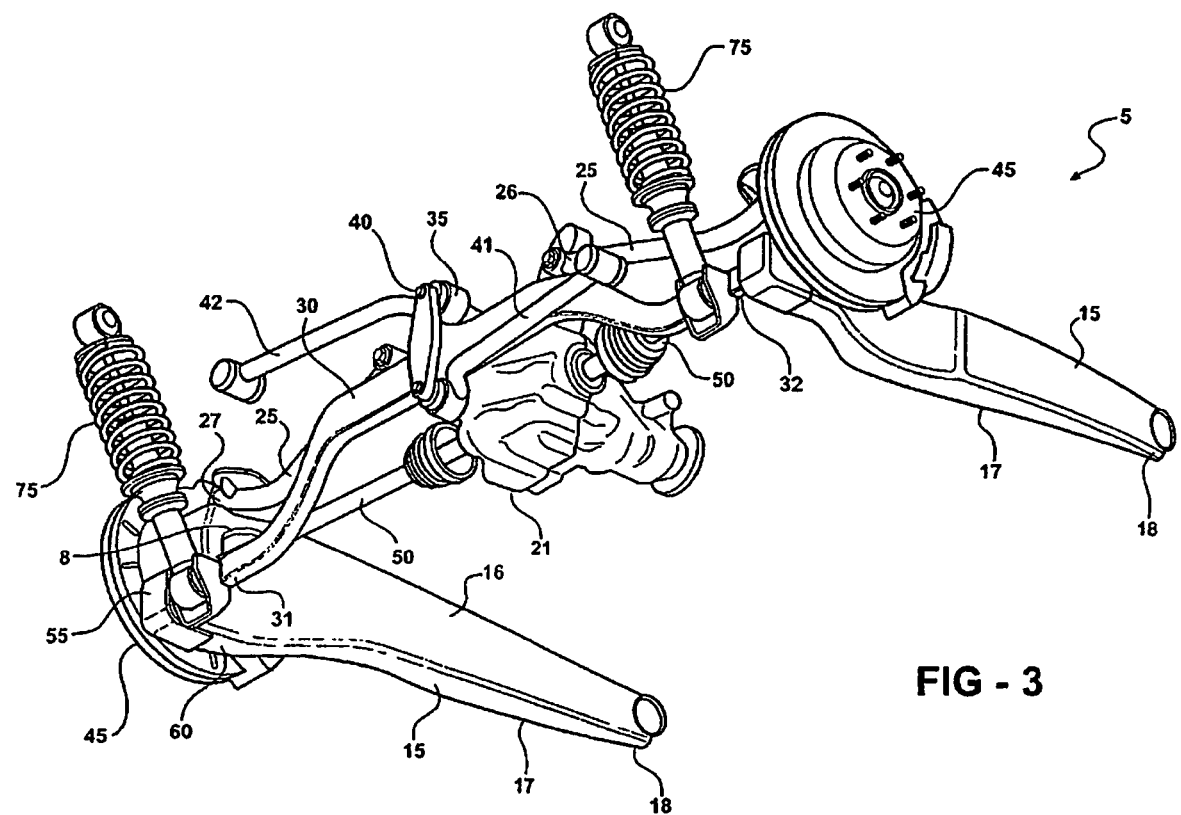
FIG. 3 is a perspective view detailing the suspension system without the wheels and frame rail.
Figure 4:
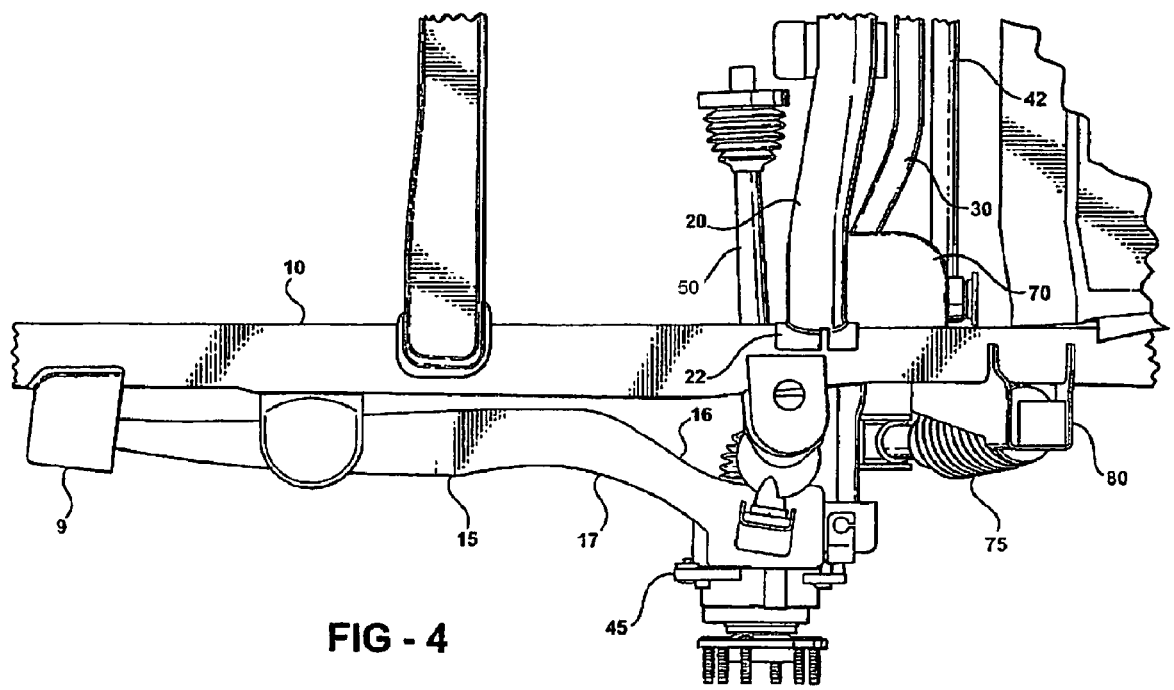
FIG. 4 is a partial top view detailing the attachment of the trailing arm, upper control arm and compound link with the frame rail.

As best seen in FIGS. 2 and 3, half shafts 50 from the transmission casing 21 are coupled to the wheel carriers 45 through an opening 8 formed in the trailing arms 15. The half shafts 50 provide rotational motion to the wheel carriers 45 from a shaft (not shown) engaging the transmission casing 21.

Referring to FIG. 3, the pair of upper control arms 25 are attached to the transmission cross member 20 (as best seen in FIG. 1) at a first end 26 of the control arm 25, and to the trailing arms 15 at the second end 27 of the upper control arm 25. The upper control arms 25 provide structural strength to the suspension system 5, as well as provide control and relieve stresses associated with the trailing arm 15 attached to the wheel carrier 45.

Again, referring to FIG. 3, the compound link member 30 is positioned between the opposing trailing arms 15 and is attached at a lower portion 55 of the trailing arm 25 by an appropriate bracket 60. The compound link member 30 includes a bell crank 35 associated therewith approximately at the center of the compound link member 30 between the pair of trailing arms 15. A watts linkage 40 including opposing connecting rods 41, 42 are attached at one end 43 to the frame rails 10 and at the other end 44 to the bell crank 35 with the use of appropriate bushings. As best seen in FIG. 2, the connecting rods 41, 42 are connected on their first end 43 to the frame rail 10 by an appropriate bracket 70 attached to the frame rail 10. The bell crank portion 35 of the watts linkage 40 provides crosswise or lateral support for the suspension as the connecting rods 41, 42 or links are positioned in a transverse direction with reference to the driving direction. The watts linkage 40 transmits the lateral forces necessary to achieve the desirable toe-in and lateral force transfer characteristics outlined in the background section of the application.

In a preferred aspect of the invention, the suspension system 5 further includes a pair of coil over shocks 75 as best seen in FIGS. 2 and 3, attached to the compound link member 30 via appropriate brackets 80. The coil over shocks 75 are attached at their other end to the spaced frame rails 10 to provide for motion of the trailing arms 15 and compound link member 30 relative to the frame rails 10.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. An integrated rear suspension assembly fixedly securable to a transmission case, rear wheel carriers, and frame rails of a motor vehicle, said integrated rear suspension assembly comprising:
    a plurality of trailing arms having first and second ends, each of said first ends secured to one of the frame rails and each of said second ends secured to each of the rear wheel carriers;
    a plurality of control arms pivotally secured to each of said plurality of trailing arms for controlling said plurality of trailing arms;
    a compound link member having opposing ends attached to each of said plurality of trailing arms;
    a transmission cross member fixedly secured to each of the frame rails, said transmission cross member including fixtures to receive and secure the transmission case and each of said plurality of control arms thereto such that said transmission cross member facilitates said integrated rear suspension assembly and the transmission case to be assembled prior to securing said integrated suspension assembly to the frame rails;
    a bell crank rotatably coupled to the compound link member; and
    first and second connecting rods each having one end coupled to the bell crank and an opposite end coupled to one of the frame rails.

2. An integrated rear suspension assembly as set forth in claim 1 wherein said transmission cross member includes fixtures for securing the transmission case thereto.

3. An integrated rear suspension assembly as set forth in claim 2 including a rear cross member having a lowered profile.

4. An integrated rear suspension assembly as set forth in claim 1 wherein the trailing arms each include apertures adapted to receive driven shafts extending from the transmission case.

5. An integrated rear suspension assembly as set forth in claim 1 further including a shock absorber having one end coupled to the compound member and another end adapted to be coupled to one of the frame rails.

6. An integrated rear suspension assembly as set forth in claim 1 wherein the control arms are coupled to the transmission cross member.

7. An integrated rear suspension assembly for a motor vehicle having a transmission case and a frame, the suspension assembly comprising:
    a transmission cross member adapted to secure the transmission case to the frame and adapted to be fixedly secured to the frame;
    first and second longitudinally extending trailing arms adapted to be pivotally coupled to the frame;
    a first control arm having a first end pivotally secured to the first trailing arm and a second end coupled to the transmission cross member;
    a second control arm having a first end pivotally secured to the second trailing arm and a second end coupled to the transmission cross member;
    a compound link member having opposing ends attached to each of the first and second trailing arms;
    a bell crank rotatably coupled to the compound link member; and
    first and second connecting rods each having one end coupled to the bell crank and an opposite end adapted to be coupled to the frame.

8. An integrated rear suspension assembly as set forth in claim 7 wherein the frame includes longitudinally extending spaced apart frame rails, the transmission cross member adapted to interconnect the frame rails.

9. An integrated rear suspension assembly as set forth in claim 8 further including a shock absorber having one end coupled to the compound member and another end adapted to be coupled to one of the frame rails.

10. An integrated rear suspension assembly as set forth in claim 7 further including rear wheel carriers coupled to ends of the first and second trailing arms.

11. An integrated rear suspension assembly as set forth in claim 7 further including a rear cross member having a lowered profile.

12. An integrated rear suspension assembly as set forth in claim 7 wherein the trailing arms each include apertures adapted to receive driven shafts extending from the transmission case.

13. An integrated rear suspension assembly as set forth in claim 7 wherein the bell crank is positioned on a rearward face of the compound link member.

14. An integrated rear suspension assembly as set forth in claim 7 wherein the first connecting rod extends substantially transversely toward one side of the vehicle and the second connecting rod extends substantially transversely toward an opposite side of the vehicle.

15. An integrated rear suspension assembly as set forth in claim 9 wherein the shock absorber is positioned rearward of the compound link member.

16. An integrated rear suspension assembly fixedly securable to a transmission case, rear wheel carriers, and frame rails of a motor vehicle, said integrated rear suspension assembly comprising:
- a plurality of trailing arms having first and second ends, each of said first ends secured to one of the frame rails and each of said second ends secured to each of the rear wheel carriers;
- a plurality of control arms pivotally secured to each of said plurality of trailing arms for controlling said plurality of trailing arms;
- a compound link member being moveable relative to the frame rails and having opposing ends attached to each of said second ends of said plurality of trailing arms;
- a transmission cross member fixedly secured to each of the frame rails, said transmission cross member including fixtures to receive and secure the transmission case and each of said plurality of control arms thereto such that said transmission cross member facilitates said integrated rear suspension assembly and the transmission case to be assembled prior to securing said integrated suspension assembly to the frame rails;
- a bell crank rotatably coupled to the compound link member; and
- first and second connecting rods each having one end coupled to the bell crank and an opposite end coupled to one of the frame rails.

* * * * *